US008929636B2

(12) United States Patent
Yim

(10) Patent No.: US 8,929,636 B2
(45) Date of Patent: Jan. 6, 2015

(54) METHOD AND SYSTEM FOR IMAGE SEGMENTATION

(71) Applicant: Peter Yim, Belle Mead, NY (US)

(72) Inventor: Peter Yim, Belle Mead, NY (US)

(*) Notice: Subject to any disclaimer, the term of this patent is extended or adjusted under 35 U.S.C. 154(b) by 154 days.

(21) Appl. No.: 13/757,755

(22) Filed: Feb. 2, 2013

(65) Prior Publication Data

US 2013/0216116 A1 Aug. 22, 2013

Related U.S. Application Data

(60) Provisional application No. 61/594,248, filed on Feb. 2, 2012.

(51) Int. Cl.
G06K 9/00 (2006.01)
G06T 7/00 (2006.01)
G01N 23/04 (2006.01)

(52) U.S. Cl.
CPC ............. G06T 7/0093 (2013.01); G06T 7/0081 (2013.01); G06T 2207/10072 (2013.01); G06T 2207/20092 (2013.01); G06T 2207/20148 (2013.01); G06T 2207/30004 (2013.01)
USPC .............................. 382/131; 382/274; 378/62

(58) Field of Classification Search
USPC ......... 382/100, 103, 128–134, 154, 162, 168, 382/173, 181, 199, 232, 254, 274, 276, 285, 382/291, 305, 312; 378/62; 600/440
See application file for complete search history.

(56) References Cited

U.S. PATENT DOCUMENTS

| | | | | |
|---|---|---|---|---|
| 8,532,362 | B2 * | 9/2013 | Verbruggen et al. | 382/132 |
| 2011/0194741 | A1 * | 8/2011 | Ekin et al. | 382/128 |
| 2011/0222747 | A1 * | 9/2011 | Qian et al. | 382/128 |
| 2011/0268328 | A1 * | 11/2011 | Bar-Aviv et al. | 382/128 |
| 2012/0070044 | A1 * | 3/2012 | Avinash et al. | 382/128 |
| 2012/0078099 | A1 * | 3/2012 | Suri | 600/440 |

OTHER PUBLICATIONS

L. R. Ford; D. R. Fulkerson. Flows in Networks. Princeton, NJ: Princeton University Press, 1962.
V. King, S. Rao, R. Tarjan, "A Faster deterministic maximum flow algorithm," Journal of Algorithms, 1994, pp. 447-474.
A.V. Goldberg, S. Rao, "Beyond the flow decomposition barrier," Journal of the ACM, 45:5, 1998, pp. 783-797.
P. Christiano, J.A. Kelner, A.M. Madry, D. Spielman, S-H. Teng, "Electrical flows, laplacian systems and faster approximation of maximum flow in undirected graphs," STOC '11 Proceedings of the 43rd annual ACM symposium on Theory of computing, 2011, pp. 273-282.
I. Koutis, G. L. Miller, R. Peng. Approaching optimality for solving SDD systems. In Proceedings of the 51st Annual Symposium on Foundations of Computer Science, 2010.
I.T. Frisch, "On electrical analogs for flow networks," (1969) Proceedings of IEEE, 57:2, pp. 209-210.
Y. Boykov, V. Kolmogorov, "An Experimental comparison of min-cut/max-flow algorithms for energy minimization in vision," In IEEE Transactions on PAMI, 26:9, 2004, pp. 1124-1137.

* cited by examiner

*Primary Examiner* — Seyed Azarian
(74) *Attorney, Agent, or Firm* — Mitchell Law PLLC; Matthew W. Mitchell

(57) ABSTRACT

Method and system is disclosed for image segmentation. The method includes acquiring a digital image, constructing a graph from the digital image, calculating a plurality of cost functions, constructing an electrical network based upon the constructed graph and the plurality of calculated cost functions, simulating the electrical network using fixed-point linearization, and segmenting the image using the simulated electrical network to produce segmented layers. Simulation may be executed in parallel to achieve desirable computational efficiencies.

28 Claims, 8 Drawing Sheets

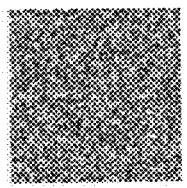
FIG. 2A
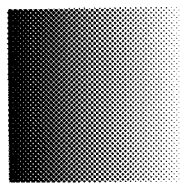 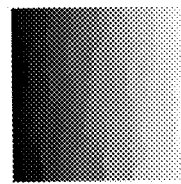 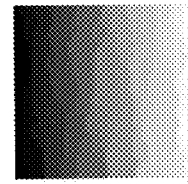 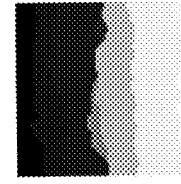
FIG. 2B  FIG. 2C  FIG. 2D  FIG. 2E

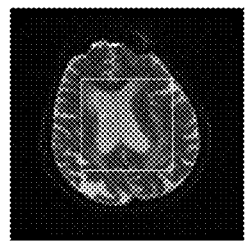
FIG. 4A
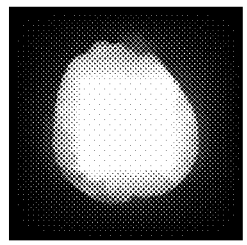 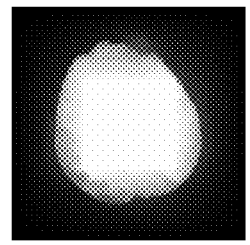
FIG. 4B  FIG. 4C
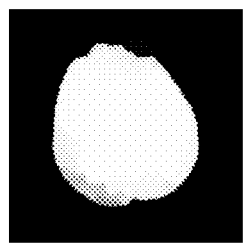 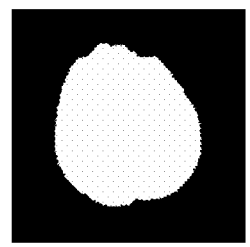
FIG. 4D  FIG. 4E

METHOD AND SYSTEM FOR IMAGE SEGMENTATION

CROSS REFERENCE TO RELATED APPLICATIONS

This application claims the benefit of U.S. Provisional Patent Application 61/594,248 filed on Feb. 2, 2012 which is hereby incorporated herein by reference.

TECHNICAL FIELD

This disclosure relates to segmenting digital images, and more particularly to image segmentation using parallel processing.

BACKGROUND

The statements in this section merely provide background information related to the present disclosure and may not constitute prior art.

Image segmentation is a branch of digital image processing that performs the task of categorizing, or classifying, the elements of a digital image into one or more class types. The class types can correspond to objects within an image. Classifying elements in a digital image has permitted a new understanding of biology, physiology, anatomy, as well as facilitated studies of complex disease processes and medical diagnostic purposes in clinical care settings. Modern medicine and clinical care are particularly poised to benefit from greater imaging capabilities.

Initial volumetric images from may be provided from known imaging devices such as X-ray computed tomography (CT), magnetic resonance (MR), 3-D ultrasound, positron emission tomography (PET) and many other imaging devices. The imaging device typically provides a 3D image data set from which to perform image segmentation in typical medical imaging applications with the classification types related to anatomical structure. For example, in thoracic medical images, it is convenient to segment the image voxels into classes such as bone, lung parenchyma, soft tissue, bronchial vessels, blood vessels, etc. There are many reasons to perform such a task, such as surgical planning, treatment progress, and patient diagnosis.

Various known analytical techniques are utilized to perform image segmentation. One known technique includes analyzing 3-D medical images as sequences of 2-D image slices that form the 3-D data. This is undesirable as contextual slice-to-slice information is lacking when analyzing sequences of adjacent 2-D images. Performing the segmentation directly in the 3-D space tends to bring more consistent segmentation results, yielding object surfaces instead of sets of individual contours. 3-D image segmentation techniques—for example, techniques known by the terms region growing, level sets, fuzzy connectivity, snakes, balloons, active shape and active appearance models—are known. None of them, however, offers a segmentation solution that achieves optimal results. The desire for optimal segmentation of an organ or a region of pathology, for example, is critical in medical image segmentation.

Recently, graph-based approaches have been developed in medical image segmentation. A common theme of these graph-based approaches is the formation of a weighted graph in which each vertex is associated with an image pixel and each graph edge has a weight relative to the corresponding pixels of that edge to belong to the same object. The resulting graph is partitioned into components in a way that optimizes specified, preselected criteria of the segmentation.

For example, one known technique adaptively adjusts the segmentation criterion based on the degree of variability in the neighboring regions of the image. The method attains certain global properties, while making local decisions using the minimum weight edge between two regions in order to measure the difference between them. This approach may be made more robust in order to deal with outliers by using a quintile rather than the minimum edge weight. This solution, however, is computationally complex, making the segmentation problem Non-deterministic Polynomial-time hard (NP-hard).

Additionally, many 2-D medical image segmentation methods are based on graph searching or use dynamic programming to determine an optimal path through a 2-D graph. Attempts extending these methods to 3-D and making 3-D graph searching practical in medical imaging are known. An approach using standard graph searching principles has been applied to a transformed graph in which standard graph searching for a path was used to define a surface. While the method provided surface optimality, it was at the cost of significant computational requirements.

A third class of graph-based segmentation methods is known to utilize minimum graph cut techniques, in which a cut criterion is designed to minimize the similarity between pixels that are to be partitioned. The approach, however, was biased towards finding small components. The bias was addressed later by ratio regions, minimum ratio cycles, and ratio cuts. However, all these techniques are applicable only to 2-D settings. Considering the self-similarity of the regions and captures non-local properties of the image, a novel normalized cut criterion for image segmentation was developed. Recently, it has been shown that Eigen vector-based approximation is related to the more standard spectral partitioning methods on graphs. However, all such approaches are computationally impractical for many applications.

Recently, energy minimization frameworks that utilize minimum s-t cuts to obtain medical image segmentation. Some embodiments consider non-convex smooth priors and developed heuristic algorithms for minimizing the energy functions. Cost functions may be utilized including those employing the "Gibbs model." Interactive segmentation algorithms for n-dimensional images based on minimum s-t cuts was further developed. In some cases, a cost function used is general enough to include both the region and boundary properties of the objects.

When applied to graphs, the minimum s-t cut produces a partition of the graph at a mathematical optimal partition of two parts. There are many algorithms that have been developed to perform the minimum s-t cut of a graph. To date, the algorithms that have proven to have the greatest execution speed for performing the minimum s-t cut involve the simulation of flow through an analogous transportation or communication network. In this analogy, the weights of the edges of the graph are considered to be maximum allowable flows. A relatively new approach to the computation of the minimum s-t cut involves the use of numerical operations. Algorithms that use numerical operations for obtaining the minimum s-t cut or an approximation to the minimum s-t cut have been developed based on the linear programming methods.

Like other graph-based approaches, the energy minimization framework utilizing s-t cuts is fairly computationally complex when utilized in medical applications. Therefore, a need exists to more efficiently execute image segmentation using an energy-based framework utilizing s-t cuts.

SUMMARY

Method and system is disclosed for image segmentation. The method includes acquiring a digital image, constructing a graph from the digital image, calculating a plurality of cost functions, constructing an electrical network based upon the constructed graph and the plurality of calculated cost functions, simulating the electrical network using fixed-point linearization, and segmenting the image using the simulated electrical network to produce segmented layers. Fixed-point linearization may be executed in parallel to achieve desirable computational efficiencies.

The minimum s-t cut can theoretically be modeled by construction of an analog electrical network that naturally assumes a binary-voltage state equivalent to the minimum s-t cut. The fundamental unit of the analog electrical network is a non-linear resistive device with a current-limiting characteristic. An algorithm is presented here for computational simulation of such an analog network as a basis for segmentation of medical images. The solution to the governing system of equations is obtained by the fixed-point method that allows for linearization of the system of equations. In certain embodiments the use of Ruge-Stuben algebraic multigrid for solution of the linear system of equations may be utilized at each iteration.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIGS. 2A-2E depicts a series of exemplary images illustrating an exemplary application of the simulated s-t cut approach to a random-intensity image, in accordance with an embodiment of the present disclosure;

FIGS. 4A-4E depicts a series of exemplary images illustrating an exemplary application of the simulated s-t cut approach to a magnetic resonance image, in accordance with an embodiment of the present disclosure;

DETAILED DESCRIPTION

Figure 1:
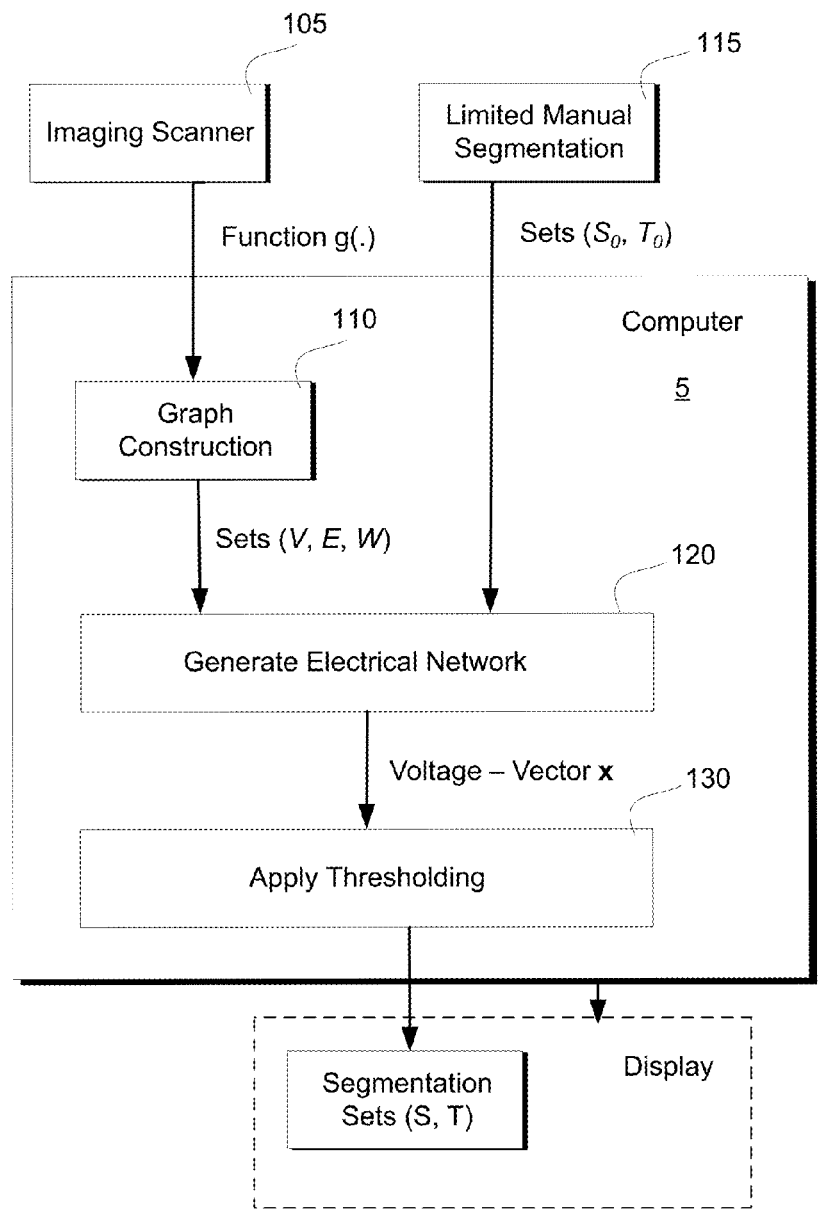
FIG. 1 schematically shows a flowchart of a segmentation algorithm, in accordance with an embodiment the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 schematically shows a flowchart of a segmentation algorithm according to an exemplary embodiment. The algorithm begins at step 105 by acquiring an n-dimensional digital image from an imaging scanner. For the purposes of this application, an image is any scalar or vector function on n-dimensional coordinates. The image may be two-dimensional, and/or three-dimensional. The digital image may be provided by any one of a number of known imaging devices including medical-based imaging device such as a magnetic resonance image, a computed tomography image, an optical coherence tomography image, or an ultrasound-originating image. It is to be appreciated that imaging, for use in embodiments of the present disclosure, can be achieved utilizing traditional scanners or any other image acquisition technique as would be appreciated by those having ordinary skill in the art.

A graph is constructed at step 110 from the n-dimensional image or, in one embodiment, a series of images. Each pixel i.e., point, of said image is associated with a vertex of said graph and said graph includes an edge connecting each pair of vertices corresponding to adjacent points in said image. The graph may be defined as $G=(V, E)$ with V representing a set of vertices of a graph, and E representing a set of edges of a graph such that every pixel u or v has a corresponding vertex.

In one embodiment, limited segmentation may be performed by a user-operator 115. The limited segmentation, or initial segmentation, may be outputted to an electrical network 120 and defined as sets of vertices $S_0$ and $T_0$ each having member nodes s and t. In one embodiment, limited segmentation may be optionally performed by assigning foreground and background seeds, either interactively or automatically by acquiring landmarks that belong to the foreground/background.

A weight W representing a sum of the weights of the edges that define the partition obtained by a minimum s-t cut, may be calculated and inputted into the electrical network 120. As one skilled in the art will readily recognize, the minimum s-t cut can be a utilized to identify two components of graph partitioning. As used herein, an s-t cut is defined with respect to two nodes, s and t, of a weighted, directed graph $G=(V,E)$. Thereby, a partition of the vertices of a graph that defines the partition obtained by the minimum s-t cut may be represented by:

$$C_v = (S, T) \quad [1]$$

given:

$$s \in S, t \in T \text{ and } S \cap T = \phi, S \cup T = V \quad [2]$$

the s-t cut may be defined as a set of edges, $C_E$, as:

$$\{(i,j) \in C_E | i \in S, j \in T\} \quad [3]$$

wherein $C_V$ is a partition of the vertices of a graph that defines the partition obtained by the minimum s-t cut, S and T are sets of vertices from the graph G that, respectively, have members s and t, $C_E$ is a subset of the edges in the graph G the defines the partition obtained by the minimum s-t cut, and i and j are vertices in the graph or nodes in the corresponding simulated electrical network as described herein below.

Given that each edge of the graph has an associated non-negative weight, w, the weight the s-t cut is the sum of the weights W of the set of edges of the cut. The sum W may be determined by:

$$W = \sum_{C_E} w_{ij} \quad [4]$$

wherein $w_{ij}$ describes the weight of the edge (i,j).

As one skilled in the art will readily recognize, preferential partitioning of the graph can thus be formulated by obtaining the minimum-weight s-t cut. Algorithms for obtaining the minimum s-t cut can be developed based on the flow-network analogy in which the maximum allowable flow, or capacity, between a pair of nodes is equated with edge weight. In this analogy, if a flow pattern in the network is consistent with the capacities of all edges in the network and if an s-t cut can be formed from the set of edges in which the flow is equal to the capacity, the s-t cut is minimal, according to the Ford-Fulkerson theorem.

One method for obtaining the minimum s-t cut is by iteratively applying a push-relabel operation in which flow, or push, is constrained to occur only in a descending manner with respect to the node labels. The labels are an estimate of distance from a given node to the sink along edges with non-zero residual capacity. The computation time for the minimum s-t cut algorithms may vary depending on the graph. Algorithms in this class have obtained worst-case computational complexities of $O(nm \log_{2+m/(n \log n)} n)$ and $O(\min\{m^{1/2}, n^{2/3}\} m \log(n^2/m) \log u_{max})$ where the graph has n nodes, m edges and a maximum edge weight or flow capacity of $u_{max}$.

An algorithm based on a linear-resistor electrical network model can be developed that allows for approximation of the minimum s-t cut with a $(1+\epsilon)$ approximation ratio. The approximate minimum s-t cut is obtained by modulation of the resistances in the network to obtain flow solutions that satisfy the maximum-flow constraints. The solution is obtained based on a near linear-time algorithm for the approximation to the solution of the system of linear equations associated with the linear-resistor network. The computational complexity of the algorithm is $\tilde{O}(m+n^{4/3}\epsilon^{-8/3})$ where $\tilde{O}(n) = O(n \log^c n)$ for an unspecified constant c.

A method for physically obtaining the minimum s-t cut for an undirected graph can be been developed. The method is to fabricate a non-linear resistive network where each resistive element represents an edge of the graph. The non-linear resistive network will naturally approach a binary-voltage state corresponding to the minimum s-t cut of the graph as the input voltage applied between the source and sink nodes approaches infinity. To obtain this behavior, the resistive elements must have the following characteristics: the current through the resistor is a non-decreasing function of the voltage across the resistor, and for a given voltage polarity, the current through the resistor is equal to or asymptotically approaches the flow capacity in the direction of the voltage polarity of the corresponding graph edge, as the voltage across the resistor approaches infinity.

Subsequent to receiving the graph-based information which may be represented as G=(V, E, W), an analog electrical network may be generated at block 120 based upon the graph-based information. In one embodiment, an analog electrical network is formed by a set of non-linear resistors that represent the edges in a given graph. To simulate the electrical network, the current-voltage characteristic of the resistors must sufficiently align with or satisfy the Frisch criteria described herein above. The following function provides valid current-voltage behavior:

$$I_{ij}(x) = \frac{w_{ij}(x_i - x_j)}{1 + |x_i - x_j|} \quad [5]$$

wherein $x=(x_1, \ldots, x_{|V|})$ is a vector of voltages at the nodes in the network, i and j are vertices in the graph or nodes in the corresponding simulated electrical network, $w_{ij}$ represents the weight of the edge at (i,j), and $I_{ij}$ is a function representing the current between each pair of nodes in the simulated electrical network.

The electrical network is thus described by a non-linear system of equations where source and sink nodes are set to the high and low input voltages respectively and voltages at the remaining nodes are governed by Kirchhoff's current law:

$$F(x) = b \quad [6]$$

where $F=(f_1, \ldots, f_{|V|})$ and:

$$f_i(x) = \begin{cases} x_i & i \in \{s, t\} \\ \sum_{j \in \Omega_i} I_{ij}(x) & i \in V/\{s, t\} \end{cases} \quad [7]$$

Wherein the vector $b=(b_1, \ldots, b_{|V|})$ represents the input conditions:

$$b_i = \begin{cases} V^+ & i = s \\ V^- & i = t \\ 0 & i \in V/\{s, t\} \end{cases} \quad [8]$$

The system of non-linear equations [6] can be rewritten in the following form:

$$A(x)x = b \quad [9]$$

wherein A is an $|V| \times |V|$ matrix of functions with the following non-zero elements:

$$a_{ij}(x) = \begin{cases} 1 & i, j \in \{s, t\}, i = j \\ -1 \times \dfrac{I_{ij}(x)}{x_i - x_j} & i, j \notin \{s, t\}, i \neq j \\ \sum_{j \in \Omega_i} \dfrac{I_{ij}(x)}{x_i - x_j} & i, j \notin \{s, t\}, i = j \end{cases} \quad [10]$$

wherein |V| is a number of vertices in the graph or the number of nodes in the simulated electrical network, and x as described herein above, is a vector representing the voltages at particular nodes, e.g., i or j, in the simulated electrical network.

A solution can then be obtained in an iterative manner. The following fixed-point linearization approach preferably requires the solution of a linear system of equations at each iteration:

$$A(\tilde{x}_k)\tilde{x}_{k+1}=b \quad [11]$$

wherein $\tilde{x}_k$ is a vector representing the approximate voltage at all nodes in the simulated electrical network at the $k^{th}$ fixed-point iteration.

In the solution to the equations governing the system of non-linear resistors, voltage gaps between adjacent nodes represent the degree to which the flow between the two nodes has saturated or reached its limiting flow capacity. In the limit, the voltage assumes a state in which it is homogeneous within each of two regions connected to the source and sink, respectively, and a voltage gap equal to the input voltage occurs along the minimum s-t cut. An approach to determining the minimum s-t cut from the simulation is to use a graph cut based on thresholding of the voltage at step 130 as shown in FIG. 1. Such a cut based on the simulation of the non-linear resistive network is represented by: $C_k^{simulation}=(S_k^{simulation}, T_k^{simulation})$, where:

$$S_k^{simulation}=\{i|\tilde{x}_{k,i}\geq 0\} \text{ and } T_k^{simulation}=\{i|\tilde{x}_{k,i}<0\} \quad [12]$$

wherein $C_k^{Simulation}$ is a partition of the vertices of a graph that is obtained by thresholding of the voltages in the simulated electrical network, $S_k^{Simulation}$ is a sub-set of the vertices of the graph that is obtained by thresholding of the voltage in the simulated electrical network that contains the vertex s, and $T_k^{Simulation}$ is a sub-set of the vertices of the graph that is obtained by thresholding of the voltage in the simulated electrical network that contains the vertex t.

The minimum s-t cut has significant potential value for image segmentation. In one approach, image segmentation can be formulated as the detection of an optimal boundary that lies between two user-defined regions or sets of pixels $U_0$ and $V_0$. Given a segmentation of the images described by:

$$A=(U,V) \quad [13]$$

and where:

$$U_0 \subset U, V_0 \subset V \text{ and } U\cap V=\phi, U\cup V=P \quad [14]$$

where P is the set of pixels in the image, a boundary B can be defined as a set of all pairs of pixels as follows:

$$B=\{(u,v)\in U\times V | |r(u)-r(v)|<d\} \quad [15]$$

wherein the function r is the position of a given pixel, and d is distance threshold between any given pair of pixels below which the pixels are considered to be adjacent.

The cost of a given boundary can be defined in terms of the pair of image intensities, g, of each pair of pixels along the boundary:

$$C(B) = \sum_{(u,v)\in B} c(g(u), g(v)) \quad [16]$$

In this formulation of image segmentation, the minimum-cost boundary is equivalent to the minimum s-t cut in the analogous graph. As such, the weight of the edges in the analogous graph is the cost function associated with pairs of pixels.

As one skilled in the art will readily recognize, various image thresholding techniques and pixel conditioning processes may be allied to the image. In one embodiment, one or more filters may be applied to an image including filters based upon pixel thresholding such as variance in pixel color intensity. In one embodiment, pixels are removed or conditioned from the image when an associated pixel color intensity value is greater than a predetermined threshold. For pixels associated with multiple colors, a pixel color intensity of any particular color that varies greater than the predetermined threshold may be removed from the image. In one embodiment, an analysis of pixel intensity changes occurring between or among a sequence of images may be used. For example, pixels associated with a pixel color intensity that changes greater than a predetermined threshold from the sequential images may be removed from the image. In one embodiment, pixels associated with identified edges or transitions in visual data may be removed or conditioned. For example, pixels having color intensity values that correspond to edges using one of several known edge detection filters, e.g., a Sobel filter, may be removed or conditioned.

In one exemplary implementation, the simulation s-t cut was successfully implemented in Python v. 2.5.4 using the packages Numerical Python (Numpy), Scientific Python (Scipy), and Algebraic Multigrid Solvers in Python (Pyamg). Two methods were implemented for solving the linear systems of equations associated with the simulation s-t cut. In the first method, the linear systems of equations were solved using Gaussian elimination. In the second method, the linear system of equations was solved in an approximate manner using Algebraic Multigrid. Coarse-fine splitting was performed by the Ruge-Stuben method based on a strength-of-connection threshold of 0.9. Coarse-fine splitting terminated at a coarse-grid size of 100 nodes. Matrix coarsening was obtained using Galerkin projection. The solution was obtained using a single V-cycle with Symmetric Gauss-Seidel relaxation for both pre- and post-smoothing. Simulations were performed for an input voltage magnitude of $10^6$. Pixel adjacency was defined based on 8-pixel neighborhood.

FIGS. 2A-2E depicts a series of exemplary images consisting of 100×100 pixel dimension and illustrating an exemplary application of the simulated s-t cut approach as described herein. FIG. 2A shows an initial random-intensity image having randomly distributed pixel intensities in the range of 0 to 100. Source and sink regions are designated as the right-most and left-most columns in a random-intensity image. Progression of voltage at fixed-point iterations including the $1^{st}$ iteration is shown in FIG. 2B and iterations at which the simulation s-t cut capacity is within 10% of the maximum flow is shown in FIG. 2C, 1% of the maximum flow is shown in FIG. 2D and equal to the maximum flow is shown in FIG. 2E.

The two regions used for initialization of the segmentation were the right-most and left-most columns of pixels, respectively. Segmentation was based on optimization of the boundary with respect to the following cost function:

$$c_{random}(u,v)=g(u)+g(v) \quad [17]$$

Figure 3:
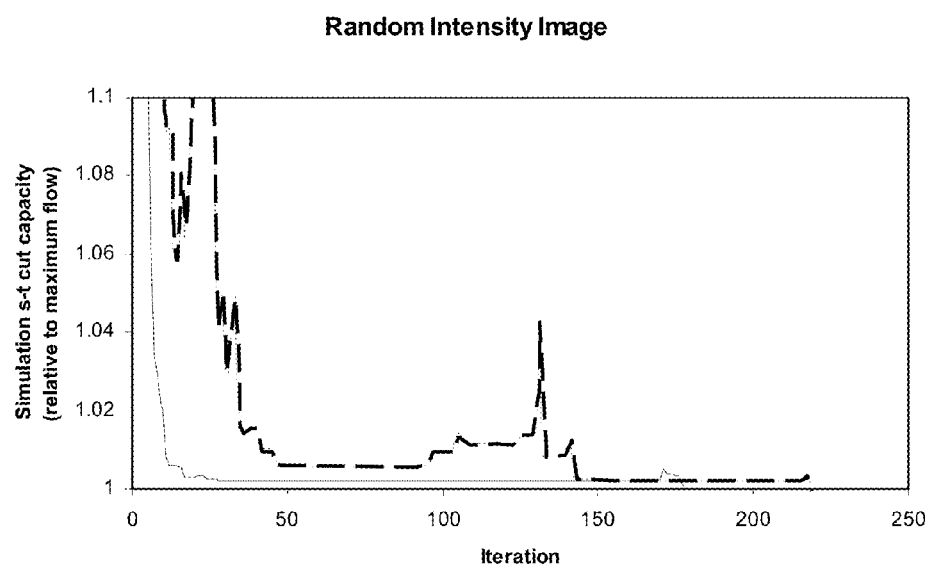
FIG. 3 graphically shows a simulation s-t cut capacity relative to maximum flow in comparison to the number of iterations as applied to the exemplary random-intensity image, in accordance with an embodiment of the present disclosure.

FIG. 3 graphically shows the simulation s-t cut capacity relative to maximum flow in comparison to the number of iterations as applied to the above exemplary random-intensity image. Convergence of the simulation s-t cut capacity to the minimum s-t cut capacity for the Gaussian elimination is shown as the full-line and the Algebraic Multigrid implementations is shown as a dashed-line. For comparison, the maximum flow (equivalent to the capacity of the minimum s-t cut) of the graph was obtained using h_prf implementation of the push-relabel algorithm. The simulated s-t cut converged identically to the minimum s-t cut in 178 iterations using the algorithm based on Gaussian elimination and 218 iterations using the algorithm based on Algebraic Multigrid. Time for convergence of the simulation s-t cut to the minimum s-t cut was 12.94 seconds. In comparison, the minimum s-t cut was obtained in 31 msec by the h_prf implementation of a push-relabel algorithm.

FIGS. 4A-4E depicts a series of exemplary images for illustrating the simulated s-t cut approach as described herein applied to a magnetic resonance image. FIG. 4A illustrates an exemplary initial magnetic resonance image having source and sink regions designated as a square 100×100 region at the center of the image and the outer border of pixels in the image. The exemplary image was obtained from the Stroke Imaging Repository. Image segmentation based on the simulation s-t cut was applied to an axial section of a T2-weighted magnetic resonance image of the brain. The dimensions of the exemplary image of FIG. 4A as used in the analysis was 255×255 pixels. The two regions used for initialization of the segmentation were, respectively, a square with dimensions of 100×100 located at the center of the image and the outer border of pixels in the image.

The segmentation was based on the descending-order ranking with respect to the absolute value of the difference in the image intensity between the two pixels over the set of all adjacent pairs of pixels in the image, Q. Given a function of the intensity difference between pixels:

$$\delta(u,v)=|g(u)-g(v)| \qquad [18]$$

wherein $\delta$ is a function of the image intensities of a pair of pixels,

The cost function $c_{mri}$ for pixels u and v may then be expressed as:

$$c_{mri}(u,v)=|\{(u',v') \epsilon Q | \delta(u,v) \leq \delta(u',v')\}| \qquad [19]$$

wherein Q is a set of adjacent pairs of pixels in the image.

Progression of voltage at fixed-point iterations including the 1$^{st}$ iteration is shown in FIG. 4B and iterations at which the simulation s-t cut capacity is within 10% of the maximum flow is shown in FIG. 4C, 1% of the maximum flow is shown in FIG. 4D and equal to the maximum flow is shown in FIG. 4E.

Figure 5:
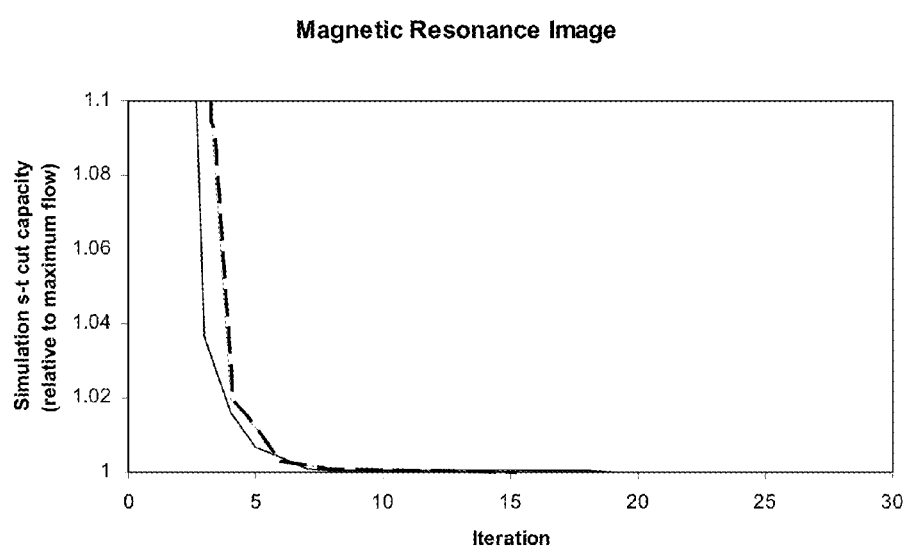
FIG. 5 graphically shows results of the simulation s-t cut capacity relative to maximum flow in comparison to the number of iterations as applied to the exemplary magnetic resonance image, in accordance with an embodiment of the present disclosure.

FIG. 5 graphically shows results of the simulation s-t cut capacity relative to maximum flow in comparison to the number of iterations as applied to the above exemplary magnetic resonance image application. Convergence of the simulation s-t cut capacity to the minimum s-t cut capacity for the Gaussian elimination is shown as the full-line and the Algebraic Multigrid implementations is shown as a dashed-line. As FIG. 5 shows, the simulation s-t cut converged to the minimum s-t cut after 19 iterations using the Gaussian elimination method and after 31 iterations using the Algebraic Multigrid method. Time for convergence of the simulation s-t cut to the minimum s-t cut was 6.11 seconds. In comparison, the minimum s-t cut was obtained in 140 msec by the h_prf implementation of the push-relabel algorithm.

Figure 6A:
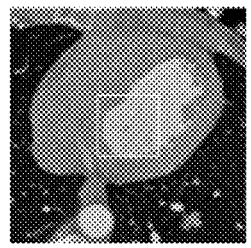
FIGS. 6A-6E depicts a series of exemplary images illustrating an exemplary application of the simulated s-t cut approach to a computed tomogram image, in accordance with an embodiment of the present disclosure.

FIGS. 6A-6E depicts a series of exemplary images for illustrating the simulated s-t cut approach as described herein applied to a computed tomogram image. FIG. 6A illustrates the exemplary initial computed tomogram image having dimensions of 191×191 pixels and having source and sink regions designated as a square 50×50 region at the center of the image and the outer border of pixels in the image. The exemplary image shown in FIG. 6A was obtained from the Medical College of South Carolina.

The simulation s-t cut was applied to the segmentation of the heart in a computed tomographic angiogram. The cost function used in the segmentation was intended to force the segmentation boundary as close as possible to an intensity threshold of −350 Hounsfield units, the units of image intensity in computed tomograms. For a function that describes the proximity of the intensity of a pair of pixels to the threshold of −350 HU:

$$\epsilon(u,v)=|(-350-g(u))+(-350-g(v))| \qquad [20]$$

wherein $\epsilon$ is a function of the image intensities of a pair of pixels.

A cost function $c_{ct}$ associated with a given pair of image intensities that is ascending order rank based on the function $\epsilon$ of the pair of image intensities may be expressed as:

$$c_{ct}(u,v)=|\{(u',v') \epsilon Q | \epsilon(u,v) \geq \epsilon(u',v')\}| \qquad [21]$$

Figure 6B:
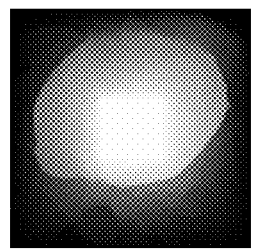
Figure 6C:
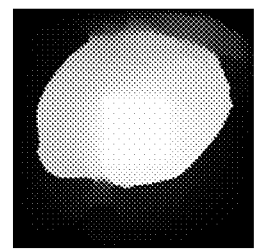
Figure 6D:
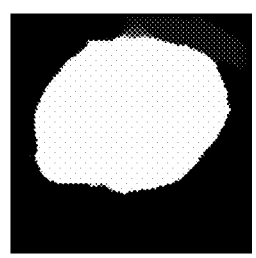
Figure 6E:
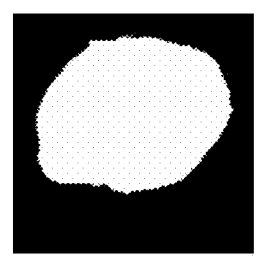

Progression of voltage at fixed-point iterations including the 1$^{st}$ iteration is shown in FIG. 6B and iterations at which the simulation s-t cut capacity is within 10% of the maximum flow is shown in FIG. 6C, 1% of the maximum flow is shown in FIG. 6D and equal to the maximum flow is shown in FIG. 6E.

Figure 7:
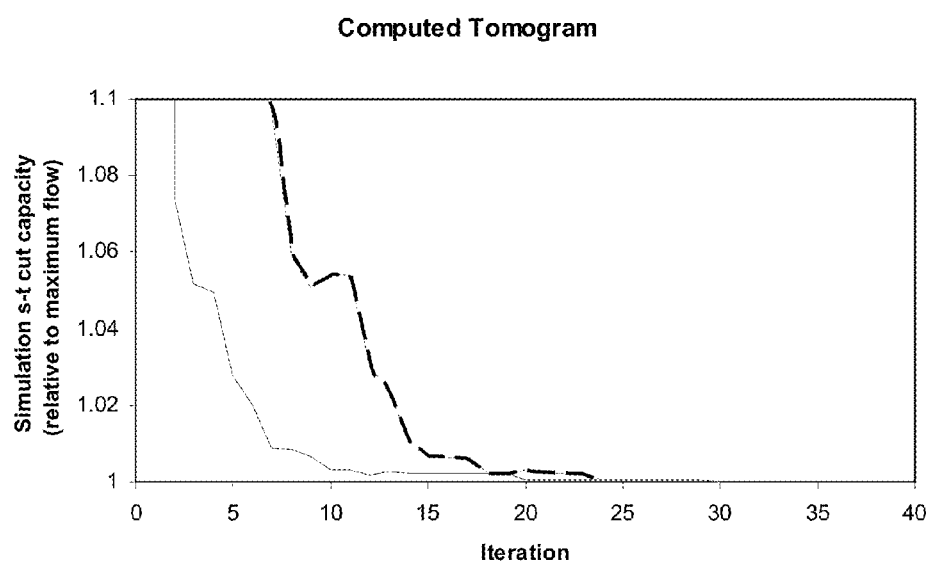
FIG. 7 graphically shows results of the simulation s-t cut capacity relative to maximum flow in comparison to the number of iterations as applied to the exemplary computed tomogram image, in accordance with an embodiment of the present disclosure.

FIG. 7 graphically shows results of the simulation s-t cut capacity relative to maximum flow in comparison to the number of iterations as applied to the above exemplary computed tomogram image. Convergence of the simulation s-t cut capacity to the minimum s-t cut capacity for the Gaussian elimination is shown as the full-line and the Algebraic Multigrid implementations is shown as a dashed-line. In one implementation, a simulation s-t cut converged to the minimum s-t cut in 31 iterations using Gaussian elimination version and 38 iterations using the Algebraic Multigrid version. Time for convergence of the simulation s-t cut to the minimum s-t cut was 4.72 seconds. In comparison, the minimum s-t cut was obtained in 219 msec by the h_prf implementation of the push-relabel algorithm.

As one skilled in the art will readily recognize, the segmentation map resulting from the image segmentation processing may also be viewed in the form of sequential slices. Interactive 3D editing and image manipulation tools may be utilized to construct clipping planes to modify segmented voxel image data by projecting vertices of a region of interest (ROI) in one plane and transforming the data within the ROI to allow all of a plurality of slices on the inside of the ROI to be along one axis of a three axis coordinate system. Known methods typically require representing the inside of the ROI as a plurality of line segments or other geometric shapes such as triangles.

Figure 8:
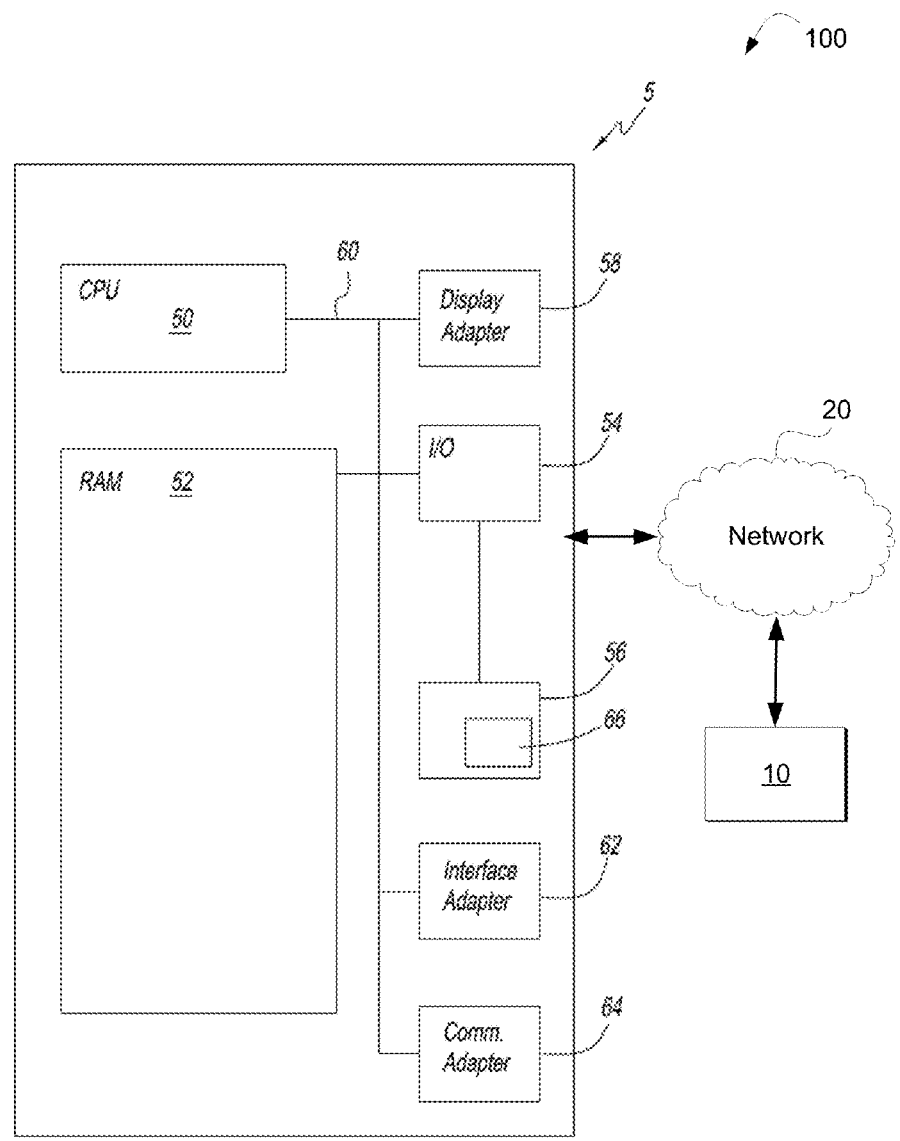
FIG. 8 schematically shows an exemplary computing system in accordance with an embodiment of the present disclosure.

FIG. 8 schematically shows an exemplary computing system 100 that may help implement the methodologies of the present disclosure. The system 100 includes a computing device 5, a network 20, and an imaging scanner 10. As shown in FIG. 1, the computing device 5 may be directly communicatively connected and communicatively connected via the network 20. The imaging scanner 10 is may be wired or wirelessly communicatively connected to the network 20. Components of the communication system 100 are shown in FIG. 1 as single elements. Such illustration is for ease of description and it should be recognized that the system 100 may include multiple additional implementations of the components, e.g., a mobile device may be physically connected to the network 20 during selected periods of operation.

The network 20 may be any suitable series of points or nodes interconnected by communication paths. The network 20 may be interconnected with other networks and contain sub networks network such as, for example, a publicly accessible distributed network like the Internet or other telecommunications networks (e.g., intranets, virtual nets, overlay networks and the like). The network 20 may facilitates the exchange of data between the imaging scanner 10 and the computing device 5 although in various embodiments the imaging scanner 10 may be directly connected to the computing device 5.

The server system 5 may be one or more of various embodiments of a computer including high-speed microcomputers, minicomputers, mainframes, and/or data storage devices. The computing device 5 preferably executes database functions including storing and maintaining a database and processes requests from the imaging scanner 10 to extract data from, or update, a database as described herein below. The server may additionally provide processing functions for the imaging scanner 10.

In addition, the imaging scanner 10 may include one or more applications that the consumer may operate. Operation may include downloading, installing, turning on, unlocking, activating, or otherwise using the application. The application may comprise at least one of an algorithm, software, computer code, and/or the like, for example, mobile application software. In the alternative, the application may be a website accessible through the world wide web.

The computing device 5 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as a keyboard, a mouse, and/or a microphone, to the system bus 60, and a communication adapter 64 for connecting the computing device 5 to the network 20. In one embodiment, the communication adapter 64 is a wireless adapter configured for extraterrestrial communication such as in a communications satellite. The storage medium 56 is configured to store, access, and modify a database 66, and is preferably configured to store, access, and modify structured or unstructured databases for data including, for example, relational data, tabular data, audio/video data, and graphical data.

The central processing unit 50 is preferably one or more general-purpose microprocessor or central processing unit(s) and has a set of control algorithms, comprising resident program instructions and calibrations stored in the memory 52 and executed to provide the desired functions including parallel processing functions. As one skilled in the art will recognize, the central processing unit 50 may have any number of processing "cores" or electronic architecture configured to execute processes in parallel. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

The present disclosure is directed to a number of imaging applications. Applications include segmentation of single surfaces, e.g., volumetric CT images, intravascular ultrasound or magnetic resonance and its 4-D extension, or tracking of such surfaces over time during the breathing cycle or over the cardiac cycle; segmentation of liver or kidney surfaces, tumor surfaces, as well as surfaces of bones, joints, or associated cartilages; surfaces separating cerebro-spinal fluid, gray matter and white matter in the brain, or surfaces of deep anatomical structures in the brain. The simulated minimum s-t cut may be utilized in non-image segmentation applications such as shape reconstruction from e.g., stereo views.

It is to be understood that while the present disclosure is described with particularity with respect to medical imaging, the principles set forth in detail herein can be applied to other imaging applications. For example, other areas of application include geological, satellite imaging, entertainment, image-guided therapy/surgery and other applications as would be appreciated by those skilled in the art.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for image segmentation comprising the steps of:
    acquiring an N-dimensional digital image, said image comprising a plurality of data items associated with an N-dimensional domain of points;
    constructing a graph from the N-dimensional digital image, wherein each point of said image is associated with a vertex of said graph and said graph includes an edge connecting each pair of vertices corresponding to adjacent points in said image;
    calculating a plurality of cost functions, wherein each calculated cost function of the plurality of cost functions is related to each identified edge;
    constructing an electrical network based upon the constructed graph and the plurality of calculated cost functions, wherein one or more points in the graph are connected to a source node and one or more points in the graph are connected to a sink node;
    simulating the electrical network using fixed-point linearization; and
    segmenting the n-dimensional digital image using the simulated electrical network to produce segmented layers.

2. The method of claim 1, wherein the cost function is associated with a similarity metric associated with an image intensity at the pair of vertices joined by the identified edge.

3. The method of claim 1, wherein the cost function is calculated using a rank sum statistic.

4. The method of claim 1, wherein the electrical network is further simulated using a serial conjugate gradient process.

5. The method of claim 1, wherein the electrical network is further simulated using a parallel conjugate gradient process.

6. The method of claim 1, wherein the electrical network is further simulated using a serial algebraic process.

7. The method of claim 1, wherein the electrical network is further simulated using a parallel algebraic process.

8. The method of claim 1, wherein the n-dimensional digital image comprises a medical image.

9. The method of claim 1, wherein the n-dimensional digital image comprises a magnetic resonance image, a computed tomography image, an optical coherence tomography image, or an ultrasound image.

10. The method of claim 1, wherein the fixed-point linearization is computationally executed in parallel.

11. The method of claim 10, wherein the computationally executed in parallel further comprises utilizing an algebraic multigrid.

12. The method of claim 1, wherein simulating the electrical network using fixed-point linearization further comprises the following steps:
    obtaining governing equations of the electrical network;
    linearizing the governing equations into linearized equations;

approximating a solution using the linearized equations; and testing the solution for convergence, wherein the solution is iteratively provided as feedback to the linearizing step when convergence is outside a predetermined threshold.

13. The method of claim 12, wherein approximating the linearized equations is executed using a Ruge-Stuben algebraic multigrid having a strength-of-connection threshold of 0.9 and a single V-cycle.

14. The method of claim 12, wherein approximating the linearized equations is executed using a parallel implementation of the algebraic multigrid.

15. A program storage device readable by a computer, tangibly embodying a program of instructions executable by the computer to perform the method steps for segmenting a digitized image, comprising the steps of:

acquiring an N-dimensional digital image representative of a medical image, said image comprising a plurality of data items associated with an N-dimensional domain of points;

constructing a graph from the N-dimensional digital image, wherein each point of said image is associated with a vertex of said graph and said graph includes an edge connecting each pair of vertices corresponding to adjacent points in said image;

calculating a plurality of cost functions, wherein each calculated cost function of the plurality of cost functions is related to each identified edge;

constructing an electrical network based upon the constructed graph and the plurality of cost functions, wherein one or more points in the graph are connected to a source node and one or more points in the graph are connected to a sink node;

simulating the electrical network using fixed-point linearization; and segmenting the n-dimensional digital image using the simulated electrical network to produce segmented layers.

16. The program storage device of claim 15, wherein simulating the electrical network using fixed-point linearization further comprises the following steps:

obtaining governing equations of the electrical network;
linearizing the governing equations into a linearized equation;
solving the linearized equation for a solution; and
testing the solution for convergence, wherein the solution is iteratively provided as feedback to the linearizing step when convergence is outside a predetermined threshold.

17. The program storage device of claim 16, wherein the linearized equation is given by:

$$A(\tilde{x}_k)\tilde{x}_{k+1}=b$$

wherein $\tilde{x}_k$ represents a vector representing the approximate voltage at all nodes in the simulated electrical network at the $k^{th}$ fixed-point iteration, wherein $A(\ )$ represents $|V| \times |V|$ matrix of functions based upon a number of vertices in the graph or the number of nodes in the simulated electrical network and b represents a vector of input conditions:

$$b_i = \begin{cases} V^+ & i=s \\ V^- & i=t \\ 0 & i \in V/\{s,t\} \end{cases}$$

wherein V+ is a positive input voltage to the electrical network, and V− is a negative input voltage to the simulated electrical network, s and t are vertices in the graph, and i is a node in the simulated electrical network.

18. The program storage device of claim 16, further comprising: determining a minimum s-t cut using a graph cut based on thresholding voltage within the electrical network.

19. The program storage device of claim 16, wherein the cost function is based upon a weight of edges in an associated graph associated with pairs of pixels.

20. The program storage device of claim 15, wherein the medical image comprises at least one of a magnetic resonance image, an optical coherence tomography image, a computed tomography image, or an ultrasound image.

21. The program storage device of claim 15, wherein constructing an electrical network based upon the constructed graph further comprises the following steps:

generating a set of nodes in the electrical network and associating the nodes to a set of vertices in the constructed graph; and generating a set of devices in the electrical network and associating the devices with a set of edges in the constructed graph, wherein the devices comprise a set of current-voltage characteristics, the current-voltage characteristics based upon a set of edge weights.

22. The program storage device of claim 21, wherein the devices are governed by the set of current-voltage characteristics.

23. The program storage device of claim 21, further comprising:

defining an electrical current between pairs of nodes in the simulated electrical network by:

$$I_{ij}(x) = \frac{w_{ij}(x_i - x_j)}{1 + |x_i - x_j|}$$

wherein i and j are vertices in the graph or nodes in the simulated electrical network, $w_{ij}$ is a weight of the edge (i,j), and x is a vector representing electrical voltages at a defined node in the simulated electrical network.

24. The program storage device of claim 21, further comprising:

defining a node of the electrical network as a source node having a positive voltage;

defining a node of the electrical network as a sink node having a negative voltage; and connecting the plurality of source nodes and connecting the plurality of sink nodes in the electrical network.

25. The program storage device of claim 24, further comprising:

connecting nodes associated with a first user-defined region to a positive input voltage and connecting nodes associated with a second user-defined region to a negative input voltage.

26. The program storage device of claim 24, wherein the positive voltage is modeled at greater than 1,000,000 volts and wherein the negative voltage is modeled at less than negative 1,000,000 volts.

27. The program storage device of claim 15, wherein the medical image comprises a three-dimensional graph used in the reconstruction of shape from stereo images.

28. A system for image segmentation comprising:
one or more computing devices;
an imaging unit, wherein the imaging unit comprises at least a computer processor which, when executed, performs a method, the method comprising:

acquiring an N-dimensional digital image, said image comprising a plurality of data items associated with an N-dimensional domain of points;

constructing a graph from the N-dimensional digital image, wherein each point of said image is associated with a vertex of said graph and said graph includes an edge connecting each pair of vertices corresponding to adjacent points in said image;

calculating a plurality of cost functions, wherein each calculated cost function of the plurality of cost functions is related to each identified edge;

constructing an electrical network based upon the constructed graph and the plurality of calculated cost functions, wherein one or more points in the graph are connected to a source node and one or more points in the graph are connected to a sink node;

simulating the electrical network using fixed-point linearization; and segmenting the n-dimensional digital image using the simulated electrical network to produce segmented layers.

* * * * *